United States Patent
Horita

(10) Patent No.: US 8,373,897 B2
(45) Date of Patent: Feb. 12, 2013

(54) METHOD OF AND SYSTEM FOR PREDICTING PRINT COLORS

(75) Inventor: Shuhei Horita, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 862 days.

(21) Appl. No.: 12/535,060

(22) Filed: Aug. 4, 2009

(65) Prior Publication Data

US 2010/0067026 A1 Mar. 18, 2010

(30) Foreign Application Priority Data

Sep. 16, 2008 (JP) ................................ 2008-236224

(51) Int. Cl.
*H04N 1/60* (2006.01)
*H04N 1/46* (2006.01)
*G03F 3/08* (2006.01)
*G06K 9/00* (2006.01)

(52) U.S. Cl. ......... 358/1.9; 358/504; 358/518; 382/162; 382/167

(58) Field of Classification Search ............. 358/1.9, 358/504, 518; 382/162, 167
See application file for complete search history.

(56) References Cited

U.S. PATENT DOCUMENTS 7,692,831 B2 * 4/2010 Nishikawa ................. 358/518
2009/0027705 A1 1/2009 Ozaki et al.

FOREIGN PATENT DOCUMENTS

JP 2006-128760 A 5/2006
JP 2007-208492 A 8/2007

* cited by examiner

*Primary Examiner* — Charlotte M Baker
(74) *Attorney, Agent, or Firm* — Sughrue Mion, PLLC

(57) ABSTRACT

A method and a system for predicting print colors are provided. A profile generator determines standard density spectral reflectances of a color chart printed under standard density conditions, first changed density spectral reflectances of a color chart printed with only the density of one of colors C, M, Y, K being changed by a given amount, and second changed density spectral reflectances of a color chart printed with the densities of the colors C, M, Y, K being changed by the same amount. The profile generator generates a print predicting profile for obtaining desired target densities, using the standard density spectral reflectances, the differences between the standard density spectral reflectances and the first changed density spectral reflectances, and corrective coefficients for obtaining the second changed density spectral reflectances, and predicts highly accurately colors of the print where the density of a desired color is changed, using the print predicting profile.

19 Claims, 13 Drawing Sheets

METHOD OF AND SYSTEM FOR PREDICTING PRINT COLORS

BACKGROUND OF THE INVENTION

1. Field of the Invention

The present invention relates to a method of and a system for predicting the print colors of a print produced by a printing press.

2. Description of the Related Art

Prints are produced by, for example, generating original film plates in various colors including cyan (C), magenta (M), yellow (Y), and black (K), for example, producing PS plates (presensitized plates) from the original film plates by exposure and development, mounting the PS plates on a printing press such as a rotary press or the like, and adjusting printing conditions including the ink film thickness, the dampening water, the temperature, etc.

As described above, complex steps are involved in producing prints. In order to produce a print in desired colors, it has been customary prior to the production of the print to generate a proof sheet using a simple output device such as a monitor, a color printer, or the like, and adjust printing conditions in order for the proof sheet to have the desired colors of the print to be produced.

Japanese Laid-Open Patent Publication No. 2006-128760, for example, discloses a method of generating color charts respectively with a printing press and a color printer, or the like, colorimetrically measuring the color charts, determining an ICC (International Color Consortium) profile representing the correspondence relationship between the halftone dot % of inks in the colors C, M, Y, K and the colorimetric values, and generating a proof sheet for prints using the ICC profile. The density of a solid image, i.e., an image with a halftone dot percent of 100%, is usually defined as a standard density by a user which may be a printing company or the like. Printing conditions including the film thickness of inks on printing presses are adjusted to achieve the standard density.

The standard density of prints may differ from user to user. If the standard density is to be changed, then it is necessary to print color charts again and produce an ICC profile once more. However, such a process is time-consuming because the color charts, each made up of a number of color patches, need to be printed and colorimetrically measured for the new standard density.

SUMMARY OF THE INVENTION

It is an object of the present invention to provide a method of and a system for predicting the print colors of a print highly accurately in easy and quick response to a change in the standard density for the print.

According to the present invention, there is provided a method of predicting the colors of a print produced by a printing press, comprising the steps of generating a standard density color chart with the printing press which is set to standard density conditions for producing the print of standard densities, and measuring the standard density color chart to determine standard measured values, generating a first changed density color chart with the printing press which is set to first changed density conditions in which the densities of color materials used to generate the print are individually changed by respective given amounts and the densities of other color materials than the color material with the changed density are fixed to the standard density conditions, and measuring the first changed density color chart to determine first changed measured values, generating a second changed density color chart with the printing press which is set to second changed density conditions in which the densities of color materials used to generate the print are changed by the same given amount, and measuring the second changed density color chart to determine second changed measured values, determining differences between the standard measured values and the first changed measured values for each of the color materials, and determining corrective coefficients for correcting the standard measured values using the differences for the respective color materials to determine the second changed measured values, wherein when desired changed density conditions are established, the colors of the print are predicted using the standard measured values, the differences for the respective color materials which correspond to the changed density conditions, and the corrective coefficients.

According to the present invention, there is also provided a print color predicting system for predicting the colors of a print produced by a printing press, comprising a difference calculator for calculating the differences, for each of color materials used to produce the print, between standard measured values obtained by measuring a standard density color chart generated with the printing press which is set to standard density conditions for producing a print of standard densities, and first changed measured values obtained by measuring a first changed density color chart generated with the printing press which is set to first changed density conditions for individually changing the densities of the color materials by respective given amounts, and fixing the densities of other color materials than the color material to be changed in density to the standard density conditions, a corrective coefficient calculator for determining corrective coefficients for correcting the standard measured values using the differences for the respective color materials, and producing second changed measured values obtained by measuring a second changed density color chart generated with the printing press which is set to second changed density conditions for changing the densities of the color materials by the same given amount, and a profile generator for correcting the standard measured values using the differences for the respective color materials set to desired changed density conditions and the corrective coefficients, and generating a print predicting profile based on the relationship between data for generating the standard density color chart and the corrected standard measured values, wherein the colors of the print are predicted using the print predicting profile.

With the method of and the system for predicting the colors of a print according to the present invention, when a print is to be produced with changed standard densities, a print predicting profile for the changed standard densities can be generated easily and quickly using measured values obtained by measuring a minimum number of color charts required without the need for generating color charts for all combinations of the densities of color materials used to produce the print, and the colors of the print can be predicted highly accurately using the print predicting profile.

The above and other objects, features, and advantages of the present invention will become more apparent from the following description when taken in conjunction with the accompanying drawings in which a preferred embodiments of the present invention is shown by way of illustrative example.

DESCRIPTION OF THE PREFERRED EMBODIMENTS

Figure 1:
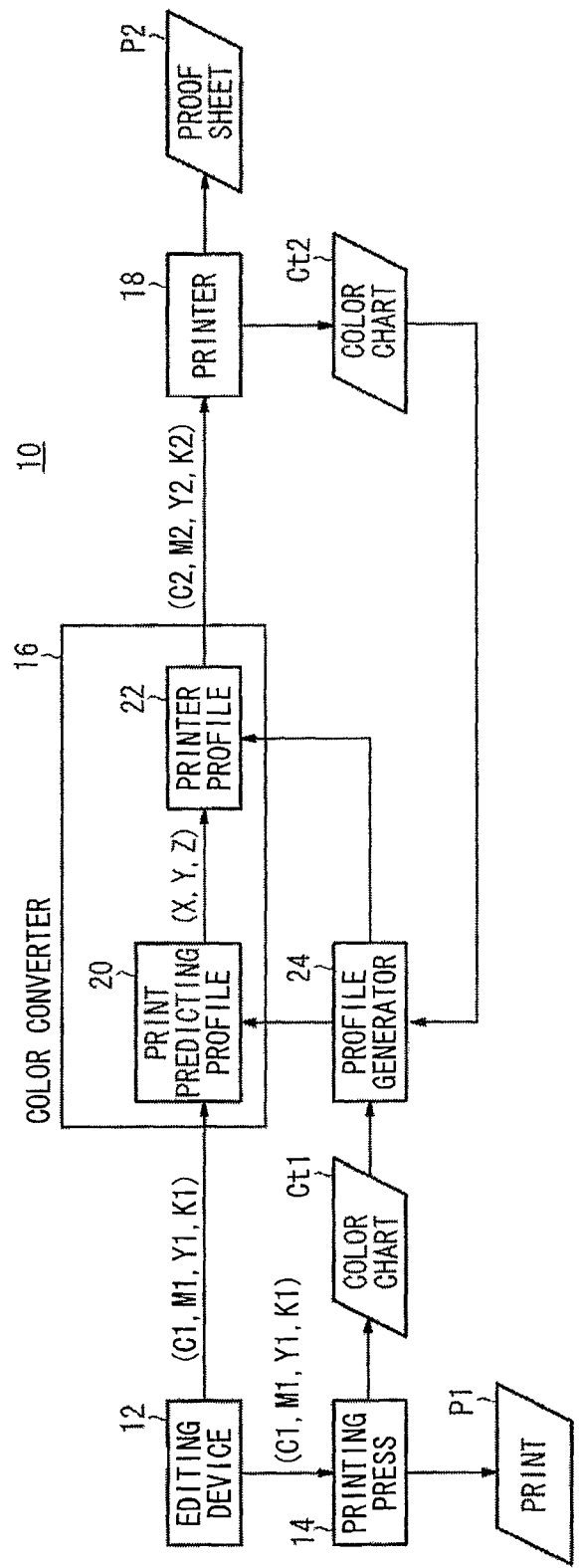
FIG. 1 is a block diagram of an overall arrangement of a print color predicting system according to an embodiment of the present invention.

Like or corresponding parts are denoted by like or corresponding reference characters throughout views.

FIG. 1 shows in block form a print color predicting system 10 according to an embodiment of the present invention. As shown in FIG. 1, the print color predicting system 10 comprises an editing device 12 for editing image data C1, M1, Y1, K1 for controlling the colors C, M, Y, K, a printing press 14 for producing a print Pi based on the edited image data C1, M1, Y1, K1, a color converter 16 for converting the image data C1, M1, Y1, K1 into image data C2, M2, Y2, K2 for predicting colors, a printer (output device) 18 for generating a proof sheet (proof) P2 for the print P1 based on the image data C2, M2, Y2, K2, and a profile generator 24 for generating a print predicting profile 20 and a printer profile (output profile) 22 which are incorporated in the color converter 16.

The print predicting profile 20 is a profile for predicting device-independent colorimetric values of the print P1 produced by the printing press 14, e.g., colorimetric values X, Y, Z or colorimetric values L*, a*, b* of the print P1. The print predicting profile 20 is generated by the profile generator 24 based on known image data C, Y, M, K and measured values of a color chart Ct1 that is produced from the image data C, M, Y, K by the printing press 14.

The printer profile 22 is a profile for converting device-independent colorimetric values of the print P1 predicted by the print predicting profile 20, e.g., colorimetric values X, Y, Z or colorimetric values L*, a*, b* of the print P1, into image data C2, M2, Y2, K2 depending on the output characteristics of the printer 18. The printer profile 22 is generated by the profile generator 24 based on known image data C, M, Y, K and measured values of a color chart Ct2 that is produced from the image data C, M, Y, K by the printer 18.

Each of the color charts Ct1, Ct2 comprises a number of color patches of primary (monochromatic) through quaternary colors produced with inks C, M, Y, K (color materials) according to halftone dot percentages set at given intervals in the range from 0 to 100%.

Figure 2:
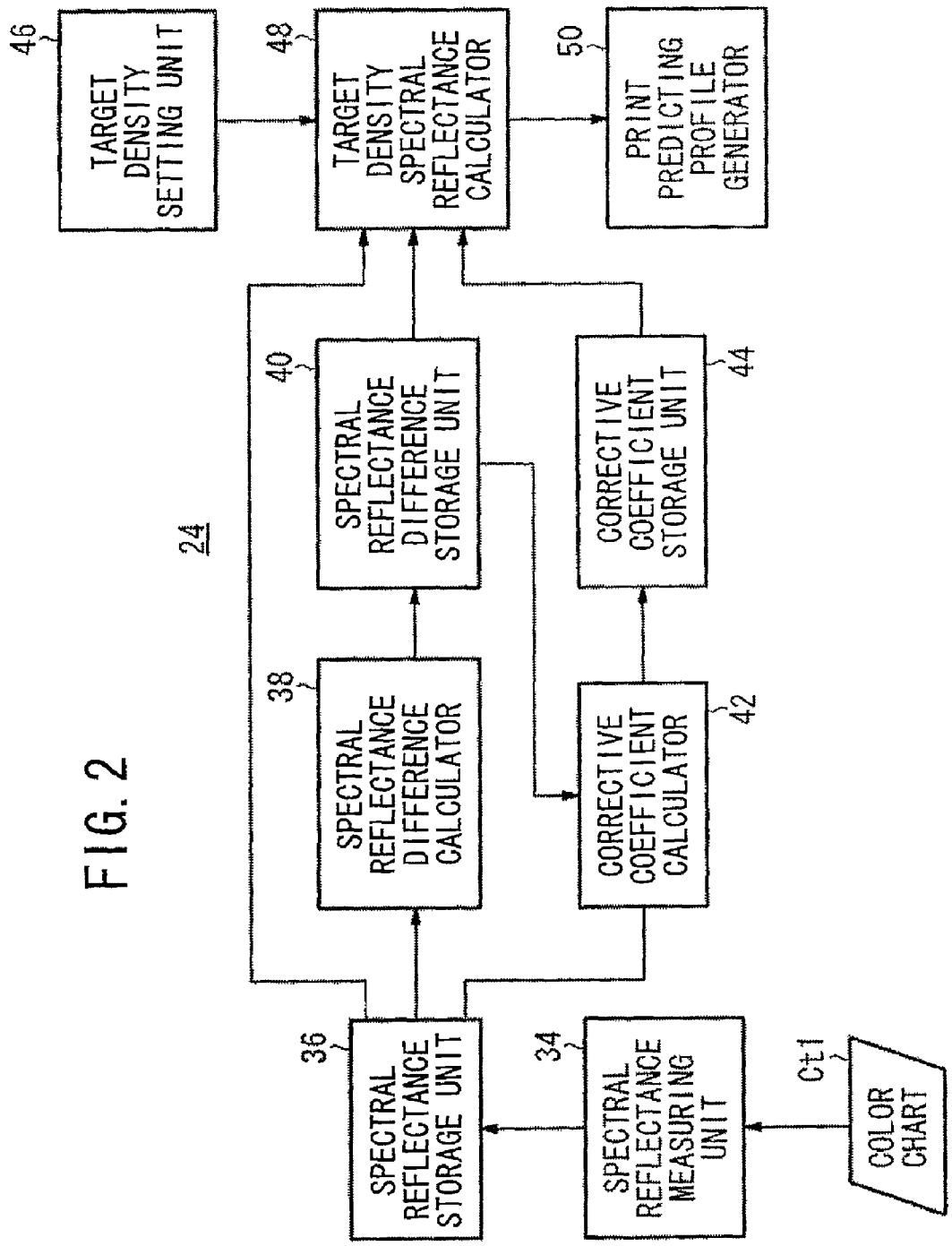
FIG. 2 is a block diagram of a function to generate a print predicting profile, of a profile generator of the print color predicting system shown in FIG. 1.

FIG. 2 shows in block form a function to generate the print predicting profile 20, of the profile generator 24. As shown in FIG. 2, the profile generator 24 includes a spectral reflectance measuring unit 34 for measuring standard density spectral reflectances (standard measured values) of a color chart Ct1 (standard density color chart) which is generated under standard density conditions set in the printing press 14, first changed density spectral reflectances (first changed measured values) of a color chart Ct1 (first changed density color chart) which is generated under first changed density conditions set in the printing press 14, and second changed density spectral reflectances (second changed measured values) of a color chart Ct1 (second changed density color chart) which is generated under second changed density conditions set in the printing press 14, a spectral reflectance storage unit 36 for storing the spectral reflectances that are measured by the spectral reflectance measuring unit 34, a spectral reflectance difference calculator 38 for calculating the spectral reflectance differences between the standard density spectral reflectances and the first changed density spectral reflectances with respect to each of the inks, a spectral reflectance difference storage unit 40 for storing the calculated spectral reflectance differences, a corrective coefficient calculator 42 for calculating corrective coefficients using the standard density spectral reflectances, the second changed density spectral reflectances, and the spectral reflectance differences, a corrective coefficient storage unit 44 for storing the calculated corrective coefficients, a target density setting unit 46 for setting desired target densities for the respective colors C, M, Y, K, a target density spectral reflectance calculator 48 for calculating target density spectral reflectances for achieving target densities, using the target densities, the standard density spectral reflectances, the spectral reflectance differences, and the corrective coefficients, and a print predicting profile generator 50 for generating a print predicting profile 20 using the target density spectral reflectances.

The standard density conditions refer to conditions for adjusting printing conditions such as ink film thicknesses, etc. of the printing press 14 such that when the printing press 14 produces the color chart Ct1 with halftone dot percentages set to be 100% for the inks C, M, Y, K, the densities of the inks of the color chart Ct1 will become the standard densities defined by a user which may be a printing company or the like. First changed density conditions refer to conditions for individually changing the densities of the inks C, M, Y, K from the standard densities by respective given amounts, and fixing the densities of other inks than the ink to be changed in density, to the standard densities. Second changed density conditions refer to conditions for changing all the densities of the inks C, M, Y, K by the same amount as the first changed density conditions.

Figure 3:
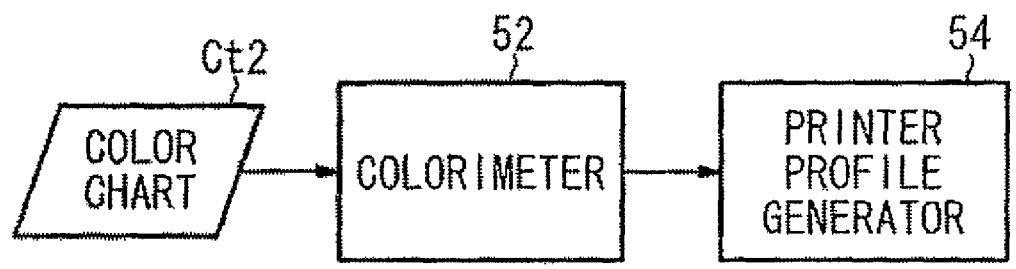
FIG. 3 is a block diagram of a function to generate a printer profile, of the profile generator of the print color predicting system shown in FIG. 1.

FIG. 3 shows in block form a function to generate the printer profile 22, of the profile generator 24. As shown in FIG. 3, the profile generator 24 includes a colorimeter 52 for measuring colorimetric values, e.g., colorimetric values X, Y, Z or colorimetric values L*, a*, b*, of the color chart Ct2 generated by the printer 18, and a printer profile generator 54 for generating a printer profile 22 using the measured colorimetric values.

Figure 4:
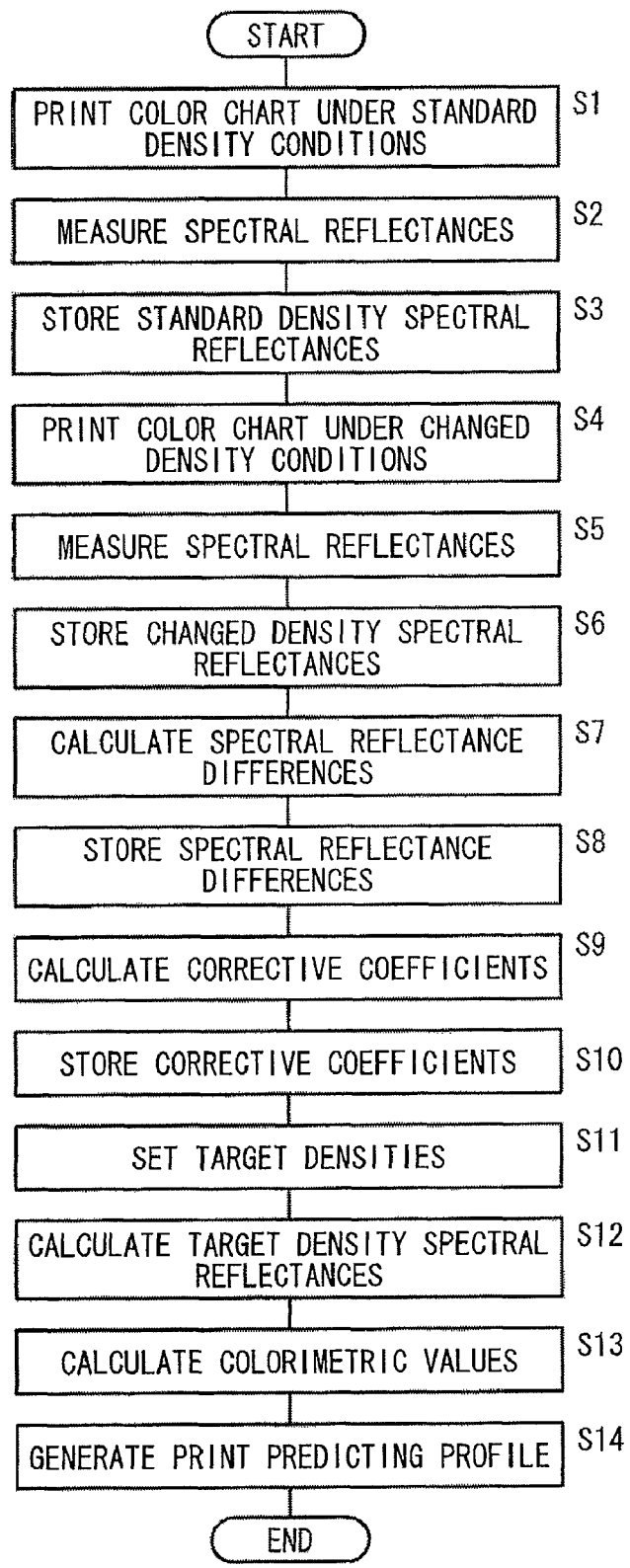
FIG. 4 is a flowchart of a sequence of generating a print predicting profile.

The print color predicting system 10 according to the present embodiment is basically constructed as described above. A print color predicting method carried out by the print color predicting system 10 will be described below with reference to a flowchart shown in FIG. 4.

The editing device 12 supplies known image data C1, M1, Y1, K1 to the printing press 14, which is set to the standard density conditions in which the monochromatic solid densities of the color patches are equal to the standard densities, and the printing press 14 prints a color chart Ct1 (step S1). The color chart Ct1 comprises a plurality of color patches printed in respective halftone dot % of the image data C1, M1, Y1, K1 at predetermined intervals in the range from 0% to 100%.

The color chart Ct1 generated by the printing press 14 set to the standard density conditions are measured for standard density spectral reflectances by the spectral reflectance measuring unit 34 (step S2). The measured standard density spectral reflectances are stored in the spectral reflectance storage unit 36 (step S3).

Then, the standard density conditions of the printing press 14 are changed to first changed density conditions and second changed density conditions, and the printing press 14 prints color charts Ct1 under the first and second changed density conditions using the same image data C1, M1, Y1, K1, which are given at predetermined intervals in halftone dot % in the range from 0% to 100%, as those for printing the color chart Ct1 under the standard density conditions in step S1 (step S4).

The first changed density conditions refer to conditions for individually changing the standard densities of the color patches produced with the inks C, M, Y, K at a halftone dot percentage of 100%, by a given amount for each of the inks, and fixing the densities of those inks other than the changed ink to the standard densities. The first changed density conditions are established such that the densities under the first changed density conditions are changed, for example, by −0.2, −0.1, +0.1 and +0.2 with reference to the standard densities under the standard density conditions in terms of optical densities. Accordingly, there are 16 color charts Ct1 generated under the first changed density conditions with the densities of the colors C, M, Y, K at the 100 halftone dot % being set to the standard density−0.2, the standard density−0.1, the standard density+0.1, and the standard density+0.2, respectively.

The second changed density conditions refer to conditions for changing the standard densities of the color patches produced with the inks C, M, Y, K at a halftone dot percentage of 100%, by the same given amount as with the first changed density conditions. Accordingly, there are 4 color charts Ct1 generated under the second changed density conditions with the densities of the colors C, M, Y, K at the 100 halftone dot % being set to the standard density−0.2, the standard density−0.1, the standard density+0.1, and the standard density+0.2, respectively.

The color charts Ct1 generated by the printing press 14 under the first and second changed density conditions are measured for first changed density spectral reflectances and second changed density spectral reflectances by the spectral reflectance measuring unit 34 (step S5). The measured first and second density spectral reflectances are stored in the spectral reflectance storage unit 36 (step S6).

It is assumed, for example, that the standard density spectral reflectance under the standard density conditions of a monochromatic solid density patch of only C 100% is represented by $R_{C(std)}$, the standard density spectral reflectance under the standard density conditions of a monochromatic solid density patch of only M 100% by $R_{M(std)}$, the first changed density spectral reflectance under the first changed density conditions for changing, by a given amount, the density of the monochromatic solid density patch of only C 100% by $(R_{C(std)}+\Delta R_C)$, and the first changed density spectral reflectance under the first changed density conditions for changing, by a given amount, the density of the monochromatic solid density patch of only M 100% by $(R_{M(Std)}+\Delta R_M)$. Then, the second changed density spectral reflectance $R_{CM}$ produced under the second changed density conditions for changing the densities of the color patches of halftone dot percentages of C 100% and M 100% by the same amount as with the first changed density conditions is ideally expressed as follows:

$$\begin{aligned} R_{CM} &= (R_{C(std)} + \Delta R_C) \cdot (R_{M(std)} + \Delta R_M) \\ &= R_{C(std)} \cdot R_{M(std)} + \\ &\quad \{R_{M(std)} \cdot (R_{C(std)} + \Delta R_C) - R_{C(std)} \cdot R_{M(std)}\} + \\ &\quad \{R_{C(std)} \cdot (R_{M(std)} + \Delta R_M) - R_{C(std)} \cdot R_{M(std)}\} + \\ &\quad \Delta R_C \cdot \Delta R_M \end{aligned} \quad (1)$$

If the fourth term on the right side of the equation (1) is small enough to be regarded as 0, then the first term on the right side represents a standard density spectral reflectance produced when the color patches of halftone dot percentages of C 100% and M 100% are generated under the standard density conditions, the second term on the right side represents the difference of a first changed density spectral reflectance produced by changing, under the first changed density conditions, the density of only C 100% of the color patches of halftone dot percentages of C 100% and M 100%, from the standard density spectral reflectance, and the third term on the right side represents the difference of a first changed density spectral reflectance produced by changing, under the first changed density conditions, the density of only M 100% of the color patches of halftone dot percentages of C 100% and M 100%, from the standard density spectral reflectance.

Therefore, the second changed density spectral reflectance $R_{CM}$ caused when the densities of both the colors C, M are changed can be determined by adding each spectral reflectance difference produced when one of the densities of the colors C, M is fixed and the other changed, to the standard density spectral reflectance $R_{C(std)} \cdot R_{M(std)}$ under the standard density conditions.

Figure 5:
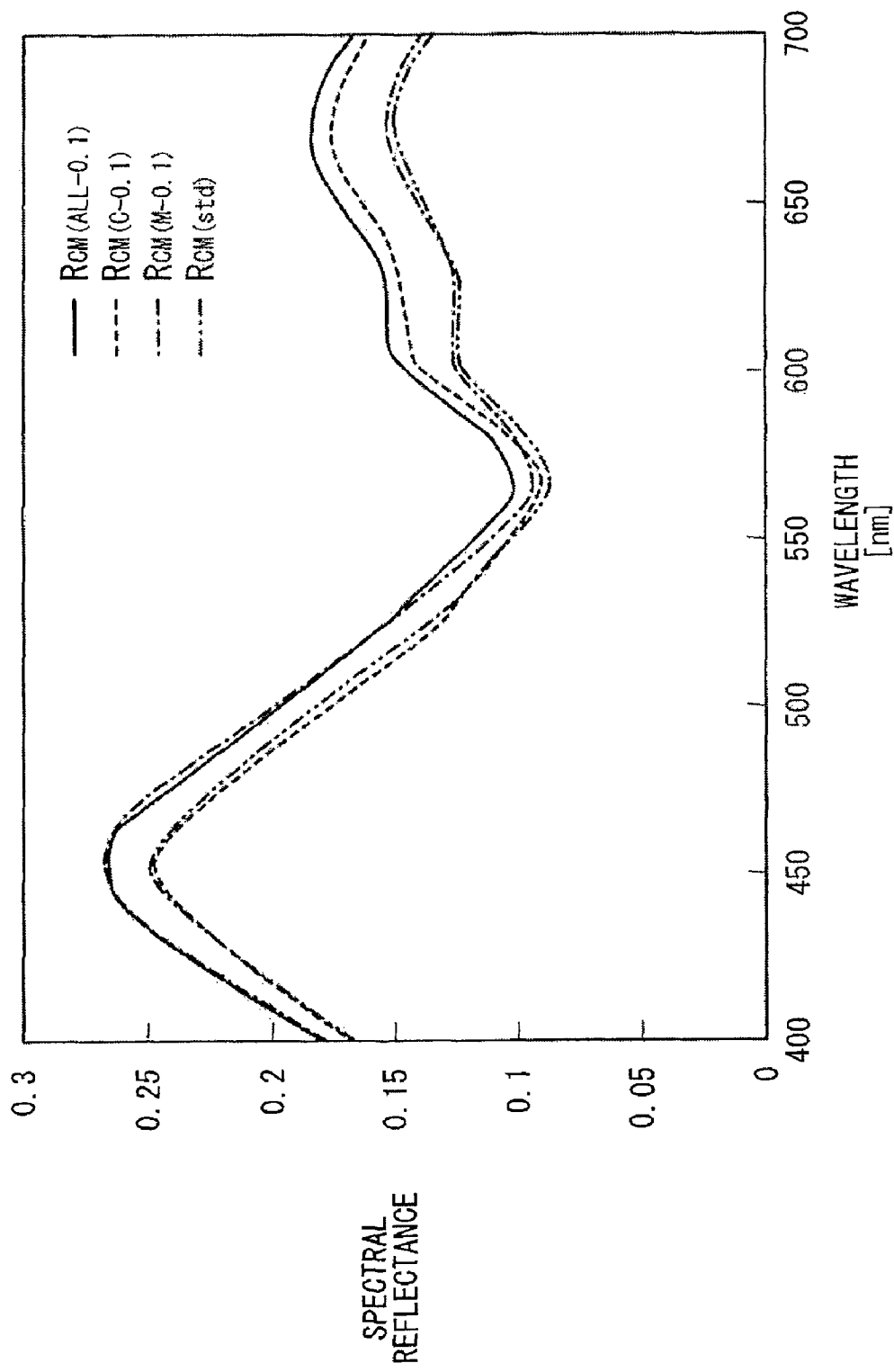
FIG. 5 is a diagram illustrative of spectral reflectances under standard density conditions and changed density conditions.

FIG. 5 shows measured data of the standard density spectral reflectance $R_{CM(Std)}$ of color patches of halftone dot percentages of C 100% and M 100% generated under the standard density conditions, the first changed density spectral reflectance $R_{CM(M-0.1)}$ of color patches generated under first changed density conditions in which C 100% is fixed to the standard density and only M 100% is changed to (standard density−0.1), the first changed density spectral reflectance $R_{CM(C-0.1)}$ of color patches generated under first changed density conditions in which M 100% is fixed to the standard density and only C 100% is changed to (standard density−0.1), and the second changed density spectral reflectance $R_{CM(ALL-0.1)}$ of color patches generated under second changed density conditions in which both C 100% and M 100% are changed to (standard density−0.1).

Figure 6:
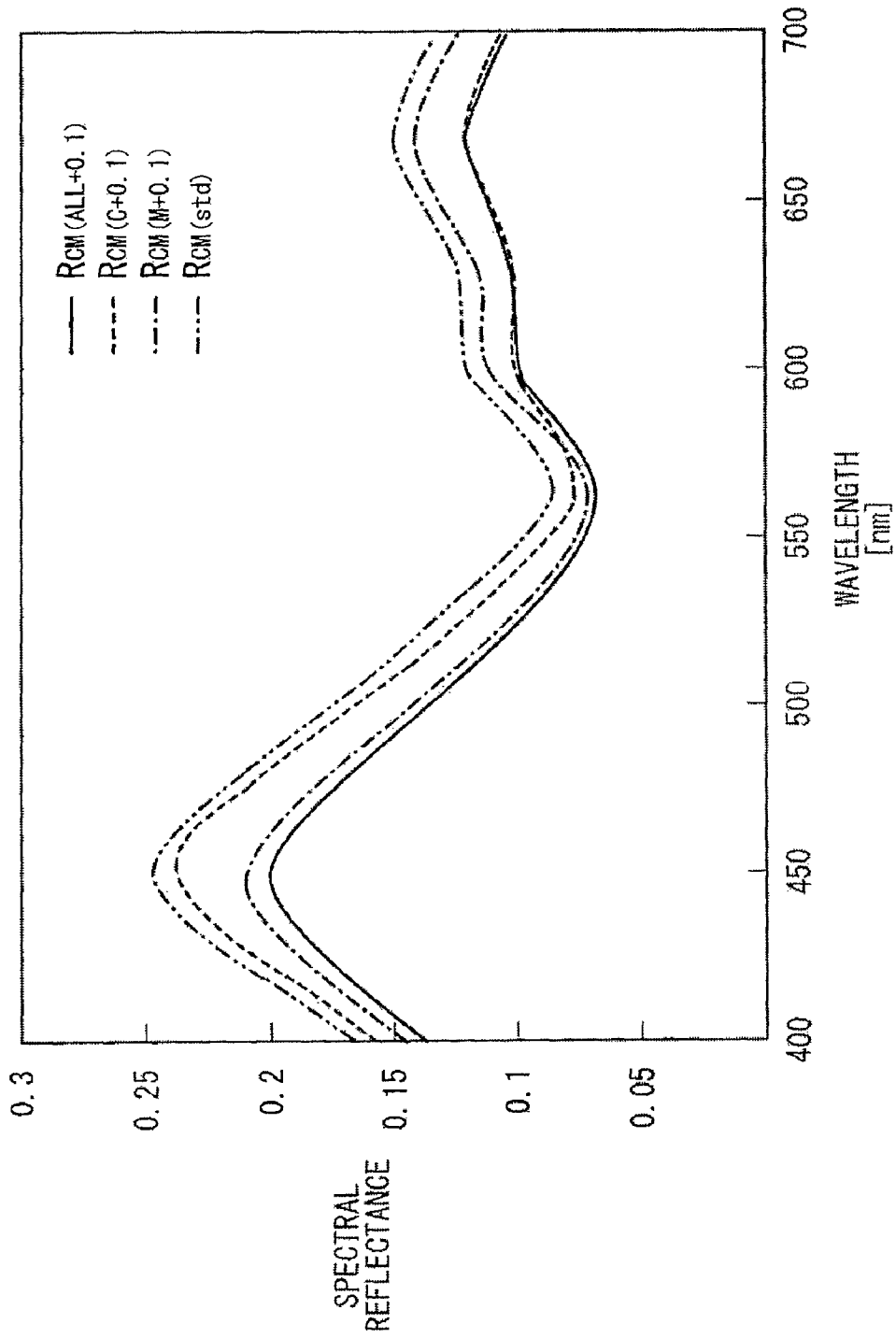
FIG. 6 is a diagram illustrative of spectral reflectances under standard density conditions and changed density conditions.

FIG. 6 shows measured data of the standard density spectral reflectance $R_{CM(Std)}$ of color patches of halftone dot percentages of C 100% and M 100% generated under the standard density conditions, the first changed density spectral reflectance $R_{CM(M+0.1)}$ of color patches generated under first changed density conditions in which C 100% is fixed to the standard density and only M 100% is changed to (standard density+0.1), the first changed density spectral reflectance $R_{CM(C+0.1)}$ of color patches generated under first changed density conditions in which M 100% is fixed to the standard density and only C 100% is changed to (standard density+ 0.1), and the second changed density spectral reflectance $R_{CM(ALL+0.1)}$ of color patches generated under second changed density conditions in which both C 100% and M 100% are changed to (standard density+0.1).

In this case, the second changed density spectral reflectance $R_{CM(ALL-0.1)}$ is approximately determined according to the equation:

$$R_{CM(ALL-0.1)} = R_{CM(std)} + (R_{CM(C-0.1)} - R_{CM(std)}) + (R_{CM(M-0.1)} - R_{CM(std)})$$

and the second changed density spectral reflectance $R_{CM(ALL+0.1)}$ is approximately determined according to the equation:

$$R_{CM(ALL+0.1)} = R_{CM(std)} + (R_{CM(C+0.1)} - R_{CM(std)}) + (R_{CM(M+0.1)} - R_{CM(std)})$$

From the above results, a target density spectral reflectance R, which is a target spectral reflectance at the time C, M, M, K are changed to an arbitrary target density under desired changed density conditions, is approximately determined according to the following equation:

$$R = R_{std} + R_{\Delta C} + R_{\Delta M} + R_{\Delta Y} + R_{\Delta K} \quad (2)$$

based on the above equation (1), where $R_{std}$ represents a standard density spectral reflectance, $R_{\Delta C}$ a spectral reflectance difference at the time the density of only C is changed, $R_{\Delta M}$ a spectral reflectance difference at the time the density of only M is changed, $R_{\Delta Y}$ a spectral reflectance difference at the time the density of only Y is changed, and $R_{\Delta K}$ a spectral reflectance difference at the time the density of only K is changed.

The equation (2) is only an approximate expression, and is based on the premises that the spectral reflectance R obtained under desired changed density conditions is determined by simply adding the spectral reflectance differences of the respective inks that are changed according to the changed density conditions. On actual prints, however, the density of each ink may affect the densities of other inks, possibly resulting in a failure to obtain an accurate target density spectral reflectance R according to the equation (2).

To circumvent the above difficulty, a corrective coefficient α in view of errors is introduced to rewrite the equation (2) into the following equation (3):

$$R = R_{std} + \alpha \cdot (R_{\Delta C} + R_{\Delta M} + R_{\Delta Y} + R_{\Delta K}) \quad (3)$$

The corrective coefficient α is determined from the equation (3) as follows:

$$\alpha = (R - R_{std})/(R_{\Delta C} + R_{\Delta M} + R_{\Delta Y} + R_{\Delta K}) \quad (4)$$

By determining the corrective coefficient α according to the equation (4), a target density spectral reflectance R under desired changed density conditions can be determined highly accurately.

The spectral reflectance difference calculator 38 reads the standard density spectral reflectance $R_{std}$ of a color chart Ct1 having standard densities generated under the standard density conditions, and the respective first changed density spectral reflectances of color charts Ct1 generated under the first changed density conditions for individually changing the densities of the inks C, M, Y, K with respect to the standard densities by a given amount, from the spectral reflectance storage unit 36, and calculates spectral reflectance differences $R_{\Delta C}$, $R_{\Delta M}$, $R_{\Delta Y}$, $R_{\Delta K}$ between the read spectral reflectances (step S7). The spectral reflectance differences $R_{\Delta C}$, $R_{\Delta M}$, $R_{\Delta Y}$, $R_{\Delta K}$ are determined with respect to, for example, the first changed density conditions for setting the colors C, M, Y, K of 100 halftone dot % to the standard density−0.2, the standard density−0.1, the standard density+0.1, and the standard density+0.2. The calculated spectral reflectance differences $R_{\Delta C}$, $R_{\Delta M}$, $R_{\Delta Y}$, $R_{\Delta K}$ are stored in the spectral reflectance difference storage unit 40 (step S8).

Then, the corrective coefficient calculator 42 calculates a corrective coefficient α for each wavelength by assigning the standard density spectral reflectance $R_{std}$, the spectral reflectance differences $R_{\Delta C}$, $R_{\Delta M}$, $R_{\Delta Y}$, $R_{\Delta K}$, and the spectral reflectance R of the color chart Ct1 generated under the second changed density conditions to the equation (4) (step 9). A corrective coefficient α is also calculated for each path of each color chart Ct1 generated under each of the second changed density conditions. The calculated corrective coefficients α are stored in the corrective coefficient storage unit 44 (step S10).

The corrective coefficients α may possibly contain errors due to measurement errors of spectral reflectances, printing irregularities of color charts Ct1, etc. In order to prevent inappropriate corrective coefficients α from being calculated, it is preferable to clip the values of corrective coefficients α to a range of $0.5 \leq \alpha \leq 1.0$, $0.75 \leq \alpha \leq 1.25$, or the like.

After the above preparatory process is finished, a print predicting profile 20 is generated at the time the standard density conditions are set to arbitrary changed density conditions.

The target density setting unit 46 sets desired target densities for the respective colors C, M, Y, K (step S11). Then, the target density spectral reflectance calculator 48 calculates the target density spectral reflectance R according to the equation (3), by assigning thereto the standard density spectral reflectance $R_{std}$ stored in the spectral reflectance storage unit 36, the spectral reflectance differences $R_{\Delta C}$, $R_{\Delta M}$, $R_{\Delta Y}$, $R_{\Delta K}$ stored in the spectral reflectance difference storage unit 40 in association with the changed densities that are equal to the target densities for the colors, and the corrective coefficients α stored in the corrective coefficient storage unit 44 in association with the changed densities that are equal to the target densities for the colors (step S12).

For changing only the standard density of C, for example, to the target density, only the spectral reflectance difference $R_{\Delta C}$ for C is used, and the target density spectral reflectance R is calculated with the other spectral reflectance differences $R_{\Delta M}$, $R_{\Delta Y}$, $R_{\Delta K}$ being set to 0. For changing the standard densities of C, M to the respective target densities, the spectral reflectance differences $R_{\Delta C}$, $R_{\Delta M}$ for C, M are used, and the target density spectral reflectance R is calculated with the other spectral reflectance differences $R_{\Delta Y}$, $R_{\Delta K}$ being set to 0.

If the standard densities of all the four colors C, M, Y, K are changed to respective target densities, then the target density spectral reflectance R can be calculated according to the equation (3). However, if the color patches to be processed for calculating the target density spectral reflectance R are in three colors C, M, Y, then the spectral reflectance difference $R_{\Delta K}$ should ideally be 0 regardless of changes in the density of K. Actually, the spectral reflectance difference $R_{\Delta K}$ may not be 0 due to printing and measuring variations.

Even if the standard densities of all the four colors C, M, Y, K are changed to respective target densities, it is desirable to calculate the target density spectral reflectance R with the spectral reflectance difference $R_{\Delta K}$ being set to 0 in the event that the color patches to be processed for calculating the target density spectral reflectance R are in three colors C, M, Y.

Similarly, in the event that the color patches to be processed for calculating the target density spectral reflectance R are in two colors C, M, it is desirable to calculate the target density spectral reflectance R with the spectral reflectance differences $R_{\Delta Y}$, $R_{\Delta K}$ being set to 0.

Corrective coefficients a may be calculated when the density of each color is positively changed, i.e., increased, and also when the density of each color is negatively changed, i.e., reduced. If it is assumed that the corrective coefficient and the spectral reflectance differences at the time the density of each color is positively changed are represented respectively by α, $R_{\Delta C}(+)$, $R_{\Delta M}(+)$, $R_{\Delta Y}(+)$, $R_{\Delta K}(+)$, and the corrective coefficient and the spectral reflectance differences at the time the density of each color is negatively changed are represented respectively by β, $R_{\Delta C}(-)$, $R_{\Delta M}(-)$, $R_{\Delta Y}(-)$, $R_{\Delta K}(-)$, then the target density spectral reflectance R at the time there are both positive and negative changes in the densities of the colors, e.g., at the time the densities of the inks C, Y are changed positively and the densities of the inks M, K are changed negatively, are expressed according to the following equation (5), rather than the equation (3):

$$R = R_{std} + \alpha \cdot R_{\Delta C}(+) + \beta \cdot R_{\Delta M}(-) + \alpha \cdot R_{\Delta Y}(+) + \beta \cdot R_{\Delta K}(-) \quad (5)$$

As with the corrective coefficients α, it is preferable to clip the values of corrective coefficients β to a range of $0.5 \leq \alpha \leq 1.0$, $0.75 \leq \alpha \leq 1.25$, or the like.

The equation (5) serves to determine the target density spectral reflectance R using the spectral reflectance differences that are determined by changing the densities of the colors from the standard densities by ±0.1 or ±0.2, for example. If the changes of the set target densities from the standard densities are other than ±0.1 or ±0.2, then the spectral reflectance differences $R_{\Delta C}$, RAM, $R_{\Delta Y}$, $R_{\Delta K}$ obtained when the changes are +0.1 and the spectral reflectance differences $R_{\Delta C}$, RAM, $R_{\Delta Y}$, $R_{\Delta K}$ obtained when the changes are +0.2 are interpolated, and the corrective coefficients α, β are also interpolated to determine a target density spectral reflectance R for the desired changes. The spectral reflectance differences may be interpolated by a known process such as linear interpolation, spline interpolation, polynomial approximation, or the like.

For example, when the density of C is changed by +0.1, the density of M by −0.2, the density of Y by +0.15, and the density of K by −0.1, the target density spectral reflectance R is determined as follows:

$$R = R_{std} + \alpha(0.1) \cdot R_{\Delta C}(+0.1) + \beta(0.2) \cdot R_{\Delta M}(-0.2) + \\ \alpha(0.15) \cdot R_{\Delta Y}(+0.15) + \beta(0.1) \cdot R_{\Delta K}(-0.1) \quad (6)$$

where α(0.1), β(0.2), α(0.15), β(0.1), $R_{\Delta C}(+0.1)$, $R_{\Delta M}(-0.2)$, $R_{\Delta Y}(+0.15)$, and $R_{\Delta K}(-0.1)$ represent corrective coefficients and spectral reflectance differences at the time the densities are changed by +0.1, −0.2, +0.15, −0.1. The corrective coefficient α(0.15) is an interpolated corrective coefficient determined by interpolating the corrective coefficient α(0.1) and the corrective coefficient α(0.2), and the spectral reflectance difference $R_{\Delta Y}(+0.15)$ is an interpolated spectral reflectance difference determined by interpolating the spectral reflectance difference $R_{\Delta Y}(+0.1)$ and the spectral reflectance difference $R_{\Delta Y}(+0.2)$.

Then, the print predicting profile generator 50 calculates colorimetric values X, Y, Z or colorimetric values L*, a*, b*, for example, from the target density spectral reflectance R thus determined (step S13), and generates a print predicting profile 20 which represents the relationship between the colorimetric values X, Y, Z or colorimetric values L*, a*, b* and the image data C1, M1, Y1, K1 used to generate the color chart Ct1 (step S14). The print predicting profile 20 generated depending on the desired changed densities is set in the color converter 16.

Figure 7:
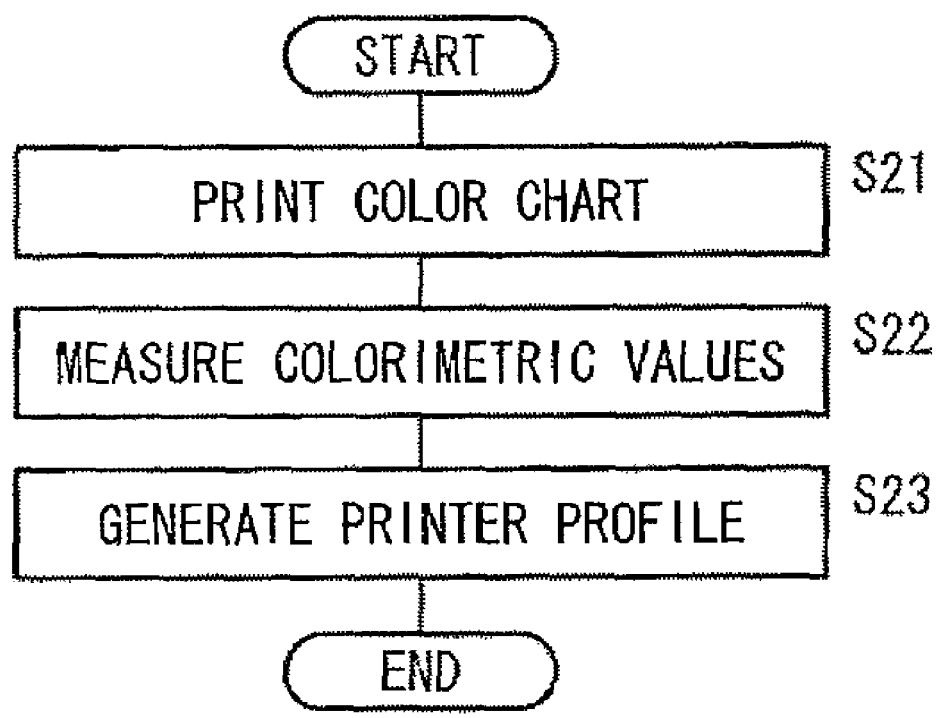
FIG. 7 is a flowchart of a sequence of generating a printer profile.

The color converter 16 supplies image data C2, M2, Y2, K2 to the printer 18, which outputs a color chart Ct2 made up of a plurality of color patches onto a recording medium (step S21 in FIG. 7) in the same manner as the color chart Ct1 being printed (step S1).

The color patches on the output color chart Ct2 are measured for colorimetric values, e.g., colorimetric values X, Y, Z or colorimetric values L*, a*, b*, by the colorimeter 52 (step S22). The printer profile generator 54 generates a printer profile 22 which represents the relationship between the measured colorimetric values X, Y, Z or colorimetric values L*, a*, b* and the image data C2, M2, Y2, K2 used to generate the color chart Ct2 (step S23). The generated printer profile 22 is set in the color converter 16. Since the printer profile 22 does not depend on the changed density conditions, the printer profile 22 only has to be set once unless the conditions of the printer 18 are changed.

After the print predicting profile 20 and the printer profile 22 have been established as described above, the printer 18 generates a proof sheet P2 for a print P1 to be produced from desired image data C1, M1, Y1, K1.

Figure 8:
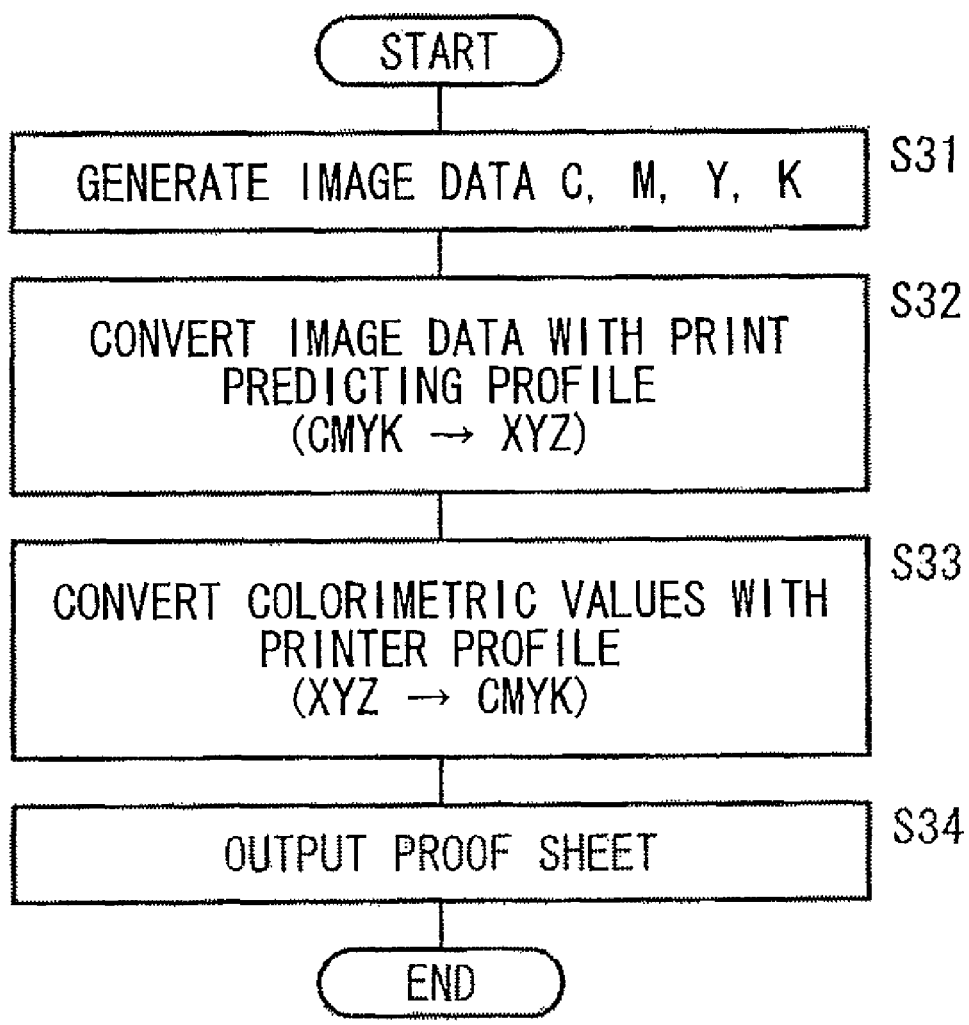
FIG. 8 is a flowchart of a sequence of generating a proof sheet.

Specifically, the editing device 12 generates desired image data C1, M1, Y1, K1 and supplies the generated image data C1, M1, Y1, K1 to the color converter 16 (step S31 in FIG. 8). In the color converter 16, using the print predicting profile 20, the image data C1, M1, Y1, K1 are converted into device-independent colorimetric values, e.g., colorimetric values X, Y, Z or colorimetric values L*, a*, b* (step S32). In this case, the print predicting profile 20 is adjusted such that each of the colors C, M, Y, K has a desired target density at a halftone dot percentage of 100%.

Then, using the printer profile 22, the colorimetric values X, Y, Z or the colorimetric values L*, a*, b* are converted into image data C2, M2, Y2, K2 depending on the output characteristics of the printer 18 (step S33). The printer 18 then produces a proof sheet P2 based on the image data C2, M2, Y2, K2 (step S34).

The print predicting profile 20 and the printer profile 22 may be combined into a single profile, and the image data C2, M2, Y2, K2 may be determined directly from the image data C1, M1, Y1, K1 using the single profile.

Instead of measuring the spectral reflectances of the color chart Ct1 with the spectral reflectance measuring unit 34, the spectral densities of the color chart Ct1 may be measured by a spectral densitometer, and the print predicting profile 20 may be generated from the measured spectral densities.

Specifically, it is assumed, for example, that the spectral density under the standard density conditions of a color chart Ct1 of only C 100% is represented by $D_{C(std)}$, the spectral density under the standard density conditions of a color chart Ct1 of only M 100% by $D_{M(std)}$, the spectral density under given changed density conditions of a color chart Ct1 of only C 100% by $(D_{C(std)}+\Delta D_C)$, and the spectral density under the given changed density conditions of a color chart Ct1 of only M 100% by $(D_{M(std)}+\Delta D_M)$. Then, the spectral density $D_{CM}$ under the given changed density conditions of a color chart Ct1 of halftone dot percentages of C 100% and M 100% is expressed as follows:

$$D_{CM} = (D_{C(std)} + \Delta D_C) + (D_{M(std)} + \Delta D_M) \quad (7)$$

$$= (D_{C(std)} + D_{M(std)}) +$$

$$[\{(D_{C(std)} + D_{M(std)}) + \Delta D_C\} - (D_{C(std)} + D_{M(std)})] +$$

$$[\{(D_{C(std)} + D_{M(std)}) + \Delta D_M\} - (D_{C(std)} + D_{M(std)})]$$

The first term on the right side of the equation (7) represents a standard spectral density produced when a color chart Ct1 of halftone dot percentages of C 100% and M 100% is generated under the standard density conditions, the second term on the right side represents the difference of a spectral density produced by changing the density of only C 100% of the color chart Ct1 of halftone dot percentages of C 100% and M 100% to given changed density conditions, from the standard density conditions, and the third term on the right side represents the difference of a spectral density produced by changing the density of only M 100% of the color chart Ct1 of halftone dot percentages of C 100% and M 100% to given changed density conditions, from the standard density conditions.

Therefore, the spectral density $D_{CM}$ caused when the densities of both the colors C, M are changed can be determined by adding each difference produced when one of the densities of the colors C, M is fixed and the other changed, to the standard spectral density $(D_{C(std)}+D_{M(std)})$ under the standard density conditions, as with the spectral reflectance $R_{CM}$. Unlike the equation (1) for determining the spectral reflectance $R_{CM}$, the spectral density $D_{CM}$ can be determined with high accuracy as the equation (7) is free of the term representing the error $\Delta R_C \cdot \Delta R_M$.

As a result, a target spectral density D at the time when C, M, M, K are changed to an arbitrary density under desired changed density conditions is highly accurately determined according to the following equation:

$$D=D_{std}+\alpha \cdot (D_{\Delta C}+D_{\Delta M}+D_{\Delta Y}+D_{\Delta K}) \quad (8)$$

in the same manner as with the equation (3), where $D_{std}$ represents a standard spectral density, $D_{\Delta C}$ a spectral density difference at the time the density of only C is changed, $D_{\Delta M}$ a spectral density difference at the time the density of only M is changed, $D_{\Delta Y}$ a spectral density difference at the time the density of only Y is changed, and $D_{\Delta K}$ a spectral density difference at the time the density of only K is changed. The corrective coefficient α can be determined for each wavelength in the same manner as with the equation (4). This holds true with the equations (5), (6). The print predicting profile 20 can be determined from the target spectral density D thus determined.

In the event that the color patches to be processed for calculating the target spectral density D are in three colors C, M, Y, it is desirable to calculate the target spectral density D with the spectral density difference $D_{\Delta K}$ being set to 0. Similarly, in the event that the color patches to be processed for calculating the target spectral density D are in two colors C, M, it is desirable to calculate the target spectral density D with the spectral density differences $D_{\Delta Y}$, $D_{\Delta K}$ being set to 0.

A print predicting profile 20 may be generated using colorimetric densities or colorimetric values rather than the spectral reflectances or spectral densities. Specifically, with respect to the colorimetric densities, corrective coefficients α are determined for respective X, Y, and Z densities. With respect to the colorimetric values, corrective coefficients a are determined for respective colorimetric values X, Y, Z. The X, Y, and Z densities refer to densities with spectral sensitivities being represented by color-matching functions x(λ), y(λ), z(λ) (λ: wavelength).

In the above description, a print predicting profile 20 corresponding to density changes from the standard densities is determined. However, intermediate densities between the maximum and minimum densities of C, M, Y, K that can be printed by the printing press 14 may be set as standard densities, and a print predicting profile 20 may be generated based on a standard density color chart and a changed density color chart which have been generated according to the intermediate densities. The intermediate densities may be set as average values of the maximum and minimum densities or arbitrary values between the maximum and minimum densities.

Since the colors of the print P1 generated by the printing press 14 vary depending on the sheet of paper used for printing and the printing conditions including the inks, the dot gain, etc., the color converter 16 should desirably convert the image data in view of changes of the printing conditions.

Figure 9:
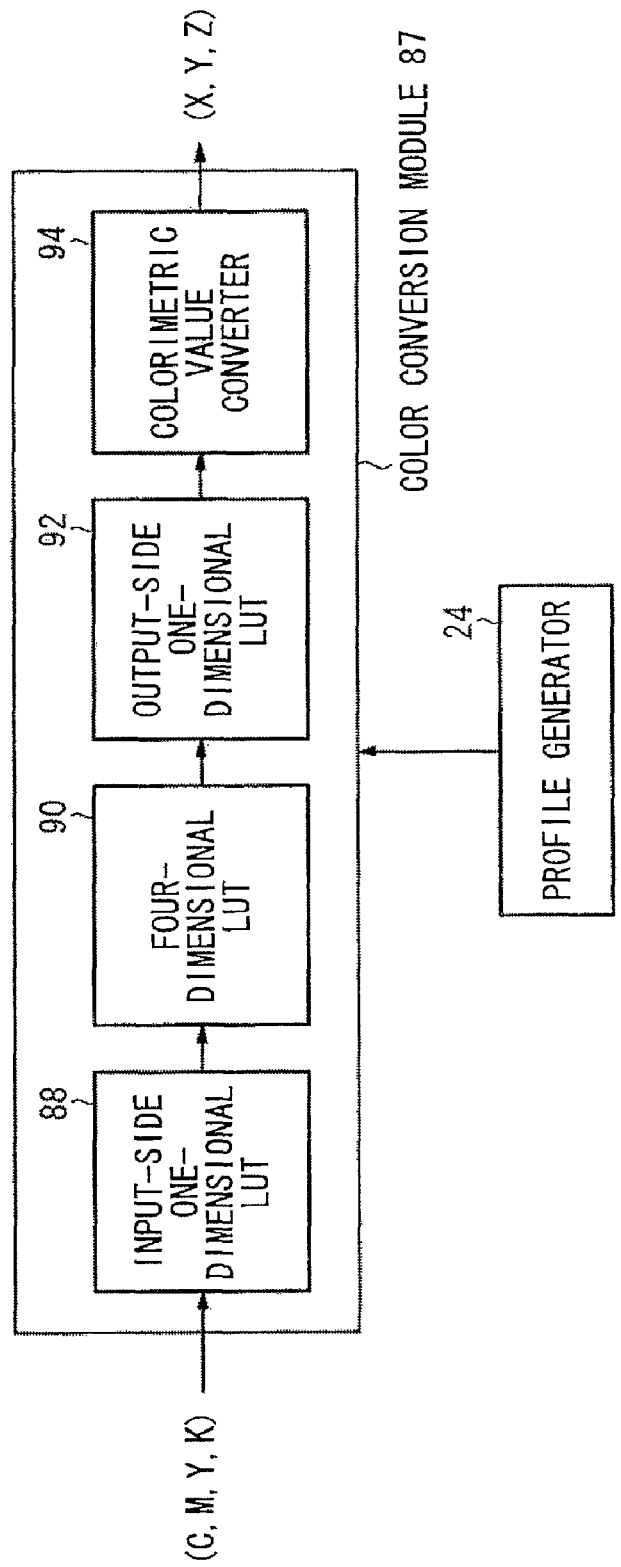
FIG. 9 is a block diagram of a modular configuration of the print predicting profile.

FIG. 9 shows a color conversion module 87, which serves as part of the color converter 16, for converting image data C, M, Y, K into colorimetric values X, Y, Z or the like using a print predicting profile 20 that is generated by the profile generator 24 based on the ICC. The color conversion module 87 comprises an input-side one-dimensional LUT (lookup table) 88 for converting the image data C, M, Y, K into image data C, M, Y, K which are accordance with a print predicting profile and which reflect the printing condition of a dot gain, a four-dimensional LUT 90 for converting the image data C, M, Y, K into colorimetric values X, Y, Z or the like which are accordance with a print predicting profile and which reflect the printing condition of inks, an output-side one-dimensional LUT 92 for converting the colorimetric values X, Y, Z or the like into desired colorimetric values X, Y, Z or the like which are accordance with a print predicting profile, and a colorimetric value converter 94 for converting the colorimetric values X, Y, Z or the like into colorimetric values X, Y, Z or the like which are accordance with a print predicting profile and which reflect the printing conditions of a print sheet.

A process carried out by the color conversion module 87 when the print sheet is changed will be described below.

Colorimetric values output from the four-dimensional LUT 90 based on the print predicting profile according to the ICC specification are represented by relative values for equalizing the color of the print sheet to standard white. Specifically, the four-dimensional LUT 90 converts the image data C, M, Y, K of the print sheet (C=M=Y=K=0) into colorimetric values X, Y, Z of a standard light source (D50 light source) or converts the image data C, M, Y, K of the print sheet (C=M=Y=K=0) into colorimetric values L*=100, a*=b*=0.

The colorimetric value converter 94 converts the relative values, referred to above, into absolute values depending on the print sheet used, based on the colorimetric values X, Y, Z or the like (color information) of the print sheet according to the print predicting profile generated by the profile generator 24. Specifically, the absolute colorimetric values of the print sheet under the standard light source (D50 light source), for example, are determined from the relative colorimetric values supplied from the output-side one-dimensional LUT 92, the sheet colorimetric values of the print sheet under the standard light source (D50 light source) according to the print predicting profile, and the light source colorimetric values of the standard light source (D50 light source), as follows:

Absolute colorimetric values=relative colorimetric values×sheet colorimetric values+light source colorimetric values.

If the colorimetric values that are input to the colorimetric value converter 94 are relative colorimetric values L*, a*, b*, then they are converted into relative colorimetric values X, Y, Z, which are then converted into absolute colorimetric values X, Y, Z according to the above equation.

When the inks used and the dot gain remain unchanged, it is possible to obtain colorimetric values X, Y, Z or the like depending on the print sheet, without the need to print a color chart Ct1, simply by giving the colorimetric values X, Y, Z or the like of the print sheet used as a print predicting profile. According to the ICC, the colorimetric values of the print sheet are given as media white point tags.

A process carried out by the color conversion module 87 when the dot gain is changed will be described below.

The dot gain varies when the blankets of the printing press 14 are deteriorated or replaced, and also varies depending on the temperature and humidity of the printing press 14. If the inks used remain unchanged, then it is possible to obtain image data C, M, Y, K in view of a variation of the dot gain by reflecting the variation of the dot gain in the input-side one-dimensional LUT 88.

Based on the relationship between one of the image data C, M, Y, K of the color chart Ct1 and one of the colorimetric values X, Y, Z or the like, the profile generator 24 generates image data C, M, Y, K after the dot gain has varied, as a print predicting profile, by printing and colorimetrically measuring the color chart Ct1 after the dot gain has varied, and corrects the input-side one-dimensional LUT 88 using the print predicting profile.

Figure 10:
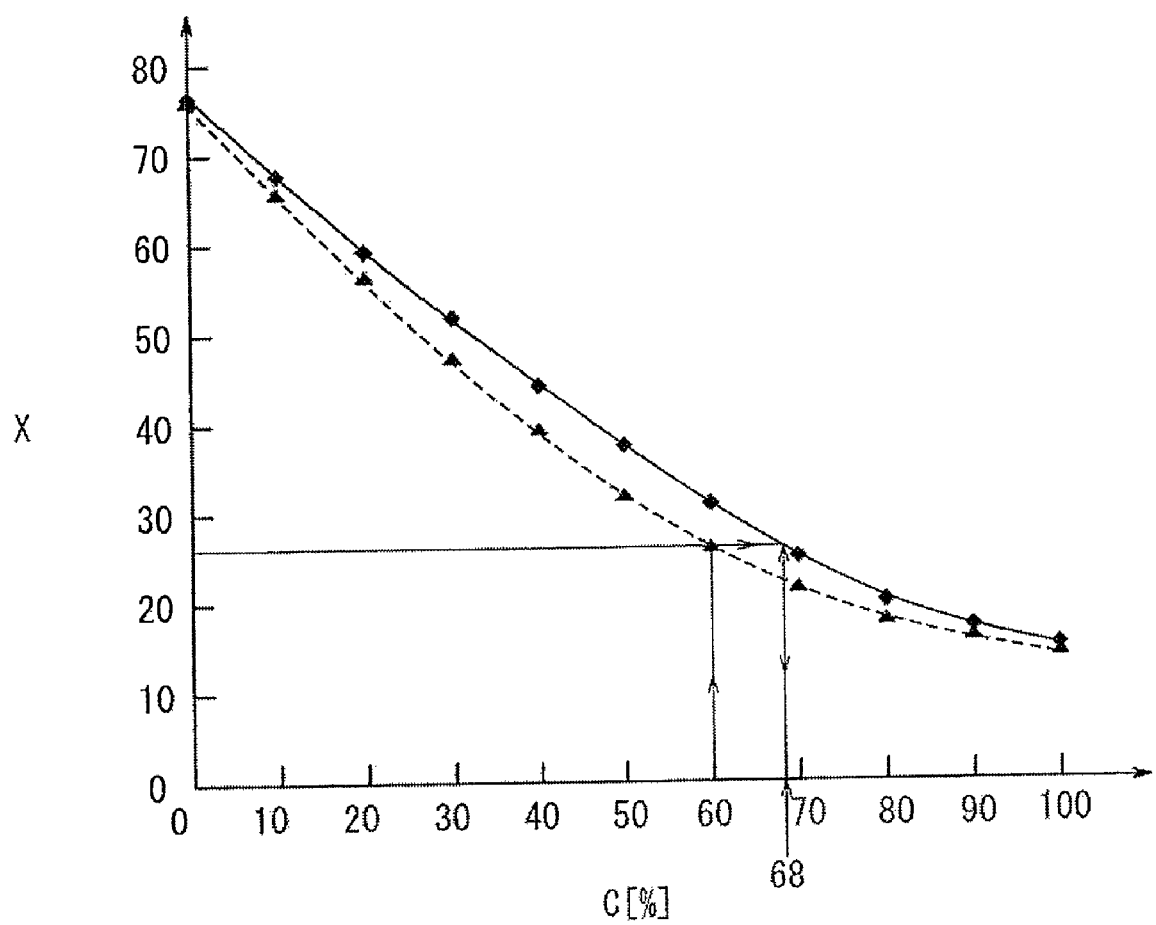
FIG. 10 is a diagram showing the relationship between the halftone dot % and calorimetric values X of image data C before and after the dot gain varies.

FIG. 10 shows the relationship between the halftone dot % and colorimetric values X of image data C before and after the dot gain varies. In FIG. 10, the solid-line curve represents the relationship before the dot gain varies, and the dotted-line curve the relationship after the dot gain varies. The dot gain does not vary if the halftone dot % is 0 or 100%. Any measurement errors can be minimized by selecting the image data C, M, Y, K and the colorimetric values X, Y, Z which undergo greatest changes. For example, it is preferable to select the relationship between the image data C and the colorimetric value X, the relationship between the image data M and the colorimetric value Y, the relationship between the image data Y (Yellow) and the colorimetric value Z, and the relationship between the image data K and the colorimetric value Y.

Figure 11:
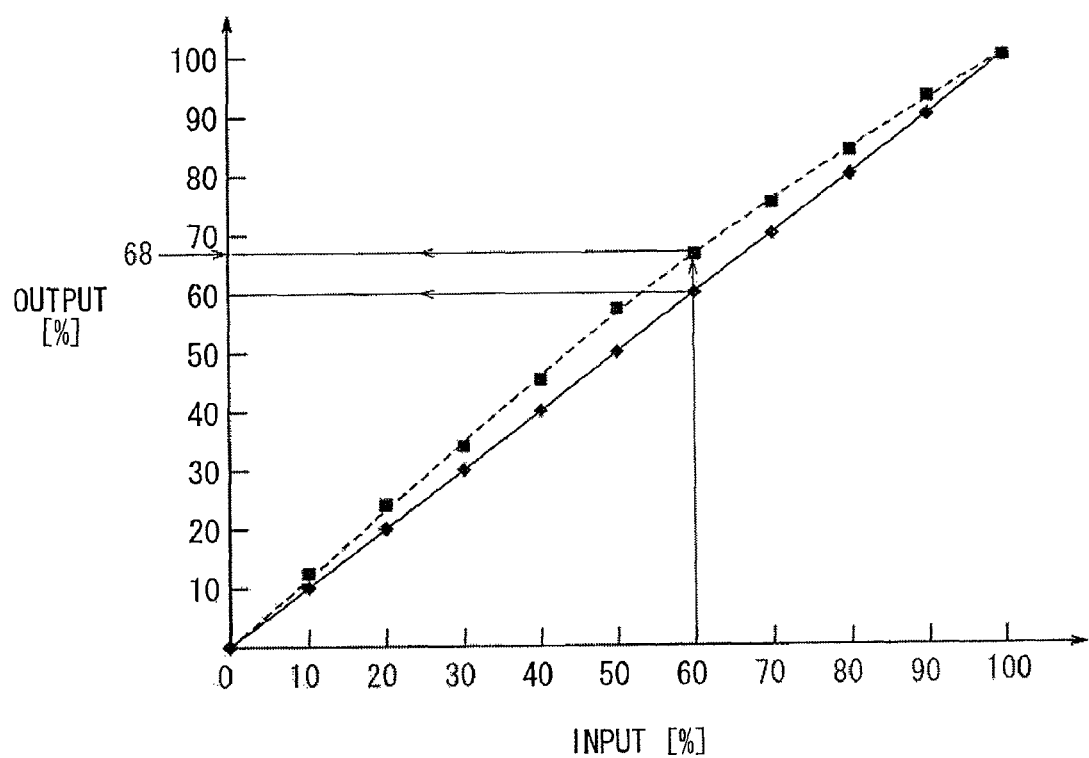
FIG. 11 is a diagram showing an input-side one-dimensional LUT.

For example, in FIG. 10, when the halftone dot % of the image data C is 60%, the halftone dot % of the image data C before the dot gain varies, for obtaining a colorimetric value X after the dot gain varies is 68%. Therefore, if the input-side one-dimensional LUT 88 is corrected to output the input image data C of 60% as image data C of 68%, then it is possible to obtain image data C taking into account the effect of the dot gain. FIG. 11 shows the input-side one-dimensional LUT 88 corrected based on these relationships. In FIG. 11, the solid-line curve represents the input-side one-dimensional LUT 88 before the dot gain varies, and the dotted-line curves the input-side one-dimensional LUT 88 after the dot gain varies.

A process carried out by the color conversion module 87 when the inks used are changed will be described below.

The printing press 14, which is set to the standard density conditions, prints a color chart Ct1, and colorimetric values, e.g., colorimetric values X, Y, Z, of the color chart Ct1 are measured by the colorimeter. The profile generator 24 determines the relationship of colorimetric values X1, Y1, Z1 to the image data C, M, Y, K of the color chart Ct1 as a print predicting profile. Then, after only the inks of the standard density conditions are changed, the profile generator 24 similarly determines the relationship of colorimetric values X2, Y2, Z2 to the image data C, M, Y, K of the color chart Ct1 as a print predicting profile.

Differences $\Delta X$, $\Delta Y$, $\Delta Z$ between the colorimetric values X1, Y1, Z1 and the colorimetric values X2, Y2, Z2 are determined, and the relationship between the differences $\Delta X$, $\Delta Y$, $\Delta Z$ and the image data C, M, Y, K is used as a differential lookup table. Using the differential lookup table, the profile generator 24 corrects a print predicting profile established under given density variation conditions, and generates a four-dimensional LUT 90 for converting the image data C, M, Y, K into colorimetric values X, Y, Z, using the corrected print predicting profile. Rather than correcting the print predicting profile, the profile generator 24 may correct colorimetric values X, Y, Z which are output values of the four-dimensional LUT 90 under the standard density conditions already generated.

In this manner, a desired four-dimensional LUT 90 can be produced simply by printing and colorimetrically measuring required minimum color charts Ct1. If both the inks and the print sheet are changed and the differences $\Delta X$, $\Delta Y$, $\Delta Z$ are determined, then it is possible to produce a four-dimensional LUT 90 taking into account both the inks and the print sheet.

Figure 12:
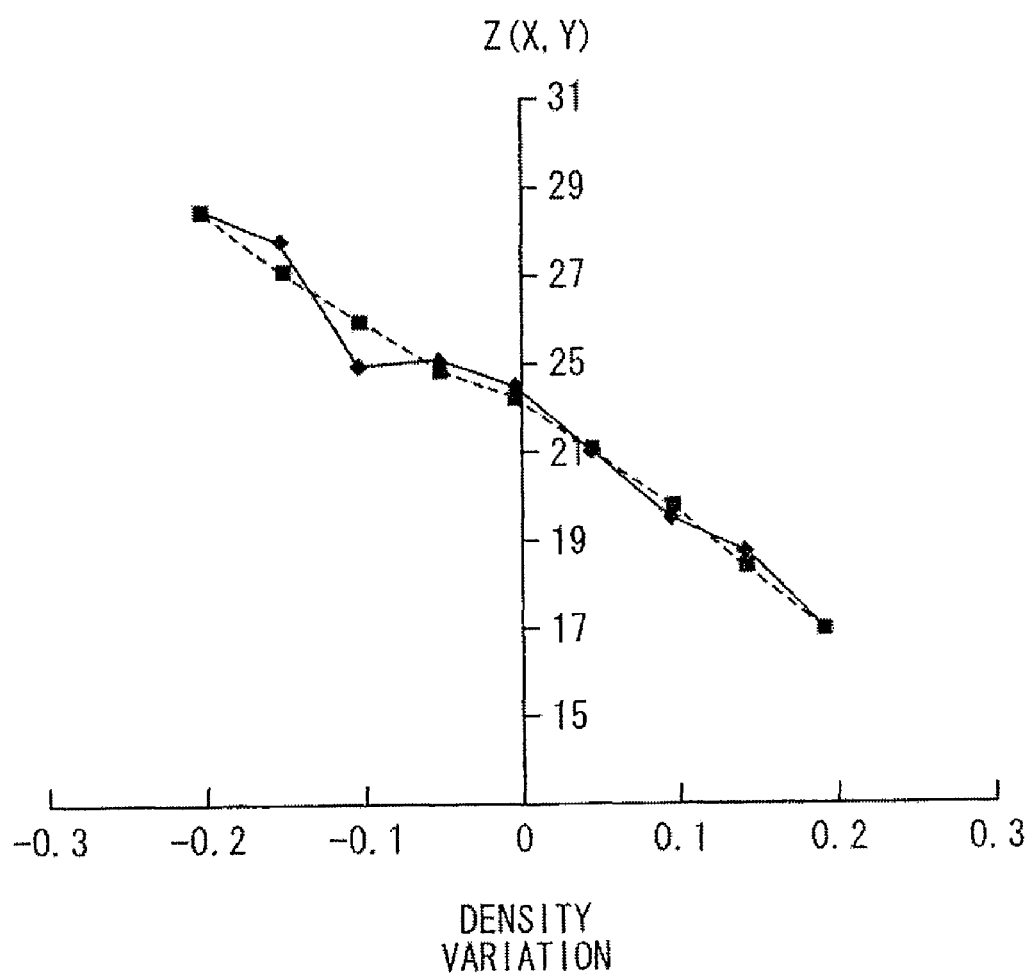
FIG. 12 is a diagram showing the relationship between density variations and colorimetric values.
Figure 13:
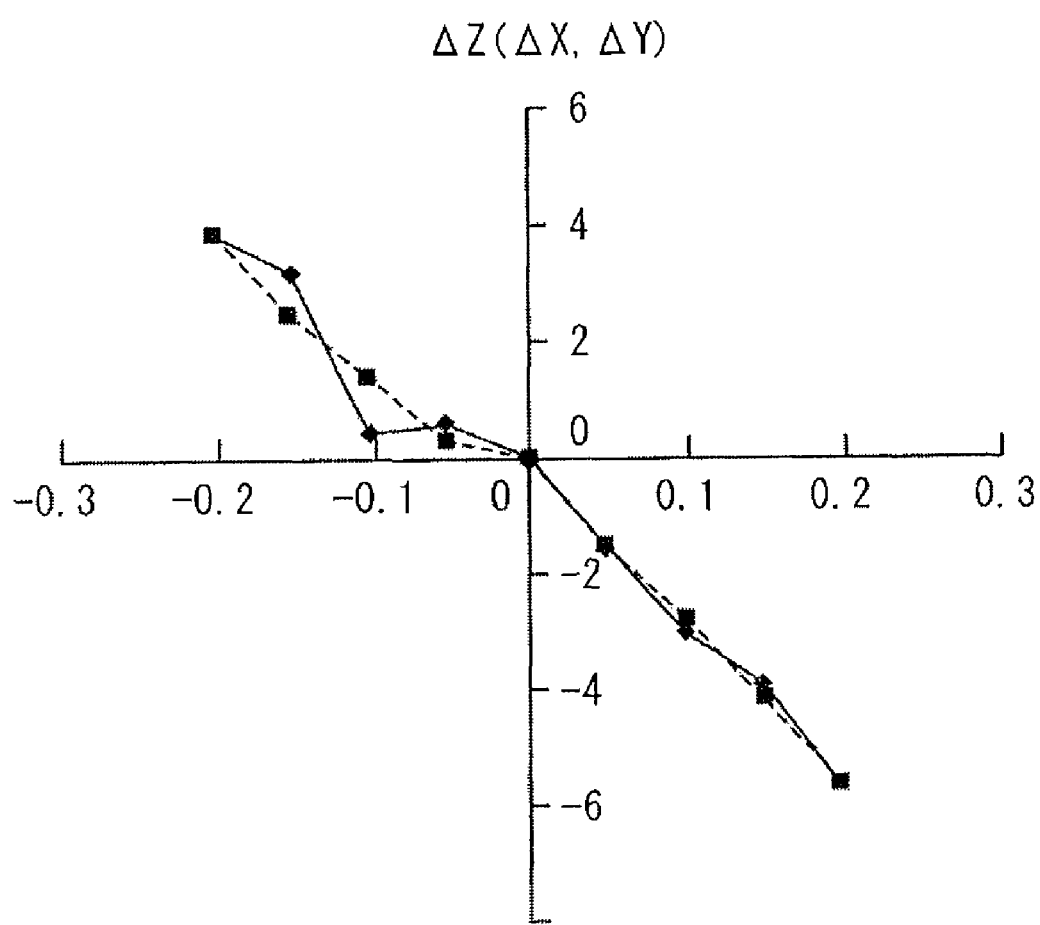
FIG. 13 is a diagram showing the relationship between density variations and colorimetric value differences.

Ideally, the colorimetric values of the color chart Ct1 that is colorimetrically measured by the colorimeter should vary monotonically with density variations, as indicated by the dotted-line curve in FIG. 12. Actually, the colorimetric values of the color chart Ct1 may be measured as greatly varied values as indicated by the solid-line curve in FIG. 12 because of variations of the printed state of the color chart Ct1 and measurement errors. Similarly, the colorimetric value differences may also be measured as greatly varied values as indicated by the solid-line curve in FIG. 13 though the differences should vary monotonically with density variations as indicated by the dotted-line curve in FIG. 13.

Preferably, the colorimetric values or the differences should be smoothed. The colorimetric values or the differences may be smoothed by averaging colorimetric values or differences which are adjacent to each other in the density varying direction, or interpolating adjacent colorimetric values or differences only in dada which are largely different from the monotonically varying data. The spectral reflectances or the spectral reflectance differences, the spectral densities or the spectral density differences, and the colorimetric densities or colorimetric density differences should also preferably be smoothed. The spectral reflectances, the spectral reflectance differences, the spectral densities, and the spectral density differences are smoothed for each wavelength.

The present invention is not limited to the illustrated embodiments, but may freely be changed or modified within the scope thereof.

For example, the print color predicting system 10 employs the printer 18 to generate the proof sheet P2. However, the print color predicting system 10 may employ a color monitor, for example, to display the proof sheet P2 thereon. In this case, the profile generator 24 colorimetrically measures the color chart Ct2 displayed on the color monitor, generates a monitor profile based on the obtained colorimetric values, and sets the monitor profile in the color converter 16.

The print predicting profile 20 may be generated with respect to an arbitrary number of colors, e.g., two or more colors, rather than the four colors C, M, Y, K.

The color materials for use on the print P1 are not limited to inks, but may be toners, for example.

Although certain preferred embodiments of the present invention have been shown and described in detail, it should be understood that various changes and modifications may be made therein without departing from the scope of the appended claims.

What is claimed is:

1. A method of predicting the colors of a print produced by a printing press, comprising the steps of:
   generating a standard density color chart with the printing press which is set to standard density conditions for producing the print of standard densities, and measuring the standard density color chart to determine standard measured values;
   generating a first changed density color chart with the printing press which is set to first changed density conditions in which the densities of color materials used to generate the print are individually changed by respective given amounts and the densities of other color materials than the color material with the changed density are fixed to the standard density conditions, and measuring the first changed density color chart to determine first changed measured values;
   generating a second changed density color chart with the printing press which is set to second changed density conditions in which the densities of color materials used to generate the print are changed by the same given amount, and measuring the second changed density color chart to determine second changed measured values;
   determining differences between the standard measured values and the first changed measured values for each of the color materials; and
   determining corrective coefficients for correcting the standard measured values using the differences for the respective color materials to determine the second changed measured values;
   wherein when desired changed density conditions are established, the colors of the print are predicted using the standard measured values, the differences for the respective color materials which correspond to the changed density conditions, and the corrective coefficients.

2. A method according to claim 1, wherein the standard measured values are corrected by adding values produced by multiplying the differences for the respective color materials which correspond to the desired changed density conditions by the corrective coefficients, and the colors of the print are predicted using the corrected standard measured values.

3. A method according to claim 2, wherein the corrective coefficients are determined for each of the given amounts.

4. A method according to claim 2, further comprising the steps of:
   determining interpolated differences by interpolating the differences for the respective color materials according to the desired changed density conditions; and
   determining interpolated corrective coefficients by interpolating the corrective coefficients for each of the different given amounts for the same color materials according to the desired changed density conditions;
   wherein when the desired changed density conditions are established, the colors of the print are predicted using the standard measured values, the interpolated differences, and the interpolated corrective coefficients.

5. A method according to claim 1, wherein the standard measured values, the first changed measured values, and the second changed measured values represent spectral reflectances.

6. A method according to claim 1, wherein the standard measured values, the first changed measured values, and the second changed measured values represent spectral densities.

7. A method according to claim 1, wherein the standard measured values, the first changed measured values, and the second changed measured values represent colorimetric densities.

8. A method according to claim 1, wherein the standard measured values, the first changed measured values, and the second changed measured values represent colorimetric values.

9. A print color predicting system for predicting the colors of a print produced by a printing press, comprising:
   a difference calculator for calculating the differences, for each of color materials used to produce the print, between standard measured values obtained by measuring a standard density color chart generated with the printing press which is set to standard density conditions for producing a print of standard densities, and first changed measured values obtained by measuring a first changed density color chart generated with the printing press which is set to first changed density conditions for individually changing the densities of the color materials by respective given amounts, and fixing the densities of other color materials than the color material to be changed in density to the standard density conditions;
   a corrective coefficient calculator for determining corrective coefficients for correcting the standard measured values using the differences for the respective color materials, and producing second changed measured values obtained by measuring a second changed density color chart generated with the printing press which is set to second changed density conditions for changing the densities of the color materials by the same given amount; and
   a profile generator for correcting the standard measured values using the differences for the respective color materials set to desired changed density conditions and the corrective coefficients, and generating a print predicting profile based on the relationship between data for generating the standard density color chart and the corrected standard measured values;
   wherein the colors of the print are predicted using the print predicting profile.

10. A print color predicting system according to claim 9, further comprising:
    an output profile for converting the predicted colors of the print which are calculated using the print predicting profile, into output data of an output device, wherein the output device outputs a proof for the print using the output profile.

11. A print color predicting system according to claim 9, wherein the profile generator corrects the standard measured values by adding thereto values produced by multiplying the differences for the respective color materials which are set to target densities different from the standard densities by the corrective coefficients.

12. A print color predicting system according to claim 11, wherein the profile generator corrects the standard measured values by adding thereto values produced by multiplying interpolated differences which are produced by interpolating the differences for the respective color materials according to desired changed density conditions, by interpolated corrective coefficients which are produced by interpolating the corrective coefficients for each of the different given amounts for the same color materials according to the desired changed density conditions.

13. A print color predicting system according to claim 9, wherein the standard measured values, the first changed measured values, and the second changed measured values represent spectral reflectances.

14. A print color predicting system according to claim 9, wherein the standard measured values, the first changed measured values, and the second changed measured values represent spectral densities.

15. A print color predicting system according to claim 9, wherein the standard measured values, the first changed measured values, and the second changed measured values represent colorimetric densities.

16. A print color predicting system according to claim 9, wherein the standard measured values, the first changed measured values, and the second changed measured values represent colorimetric values.

17. A print color predicting system according to claim 9, wherein the profile generator corrects the print predicting profile based on color information of a print sheet for use in the print.

18. A print color predicting system according to claim 9, wherein the profile generator corrects the print predicting profile based on a change which occurs in the standard measured values before and after the dot gain of the printing press varies.

19. A print color predicting system according to claim 9, wherein the profile generator corrects the print predicting profile based on a change which occurs in the standard measured values before and after the color materials used to produce the print change.

* * * * *